United States Patent [19]

Gessel et al.

[11] Patent Number: 4,520,620
[45] Date of Patent: Jun. 4, 1985

[54] HARVESTER REEL PICKUP TINE

[75] Inventors: James M. Gessel, La Moille; Gary L. Kunz; E. Louis Scheidenhelm, both of Mendota, all of Ill.

[73] Assignee: Hart-Carter Company, Minneapolis, Minn.

[21] Appl. No.: 655,163

[22] Filed: Sep. 27, 1984

[51] Int. Cl.³ ............................................ A01D 57/02
[52] U.S. Cl. ..................................................... 56/400
[58] Field of Search .......................... 56/400, 219–221, 56/227

[56] References Cited

U.S. PATENT DOCUMENTS 3,616,631  11/1971  Quam .................................... 56/400

*Primary Examiner*—Jay N. Eskovitz
*Attorney, Agent, or Firm*—Charles W. Rummler

[57] ABSTRACT

A plastic tine comprising a solid molded body adapted for mounting on a harvester crop pickup reel bat and having a finger portion of predetermined length extending from the tip of the bat at least half the length of the finger portion being of constant thickness in the front to rear flexure direction and of greater width than thickness for more than half the finger length, the finger width decreasing progressively from the edge of the bat to the tip of the finger, whereby the upper portion of the finger will flex in the fore-and-aft direction but not sideways except under extreme load, and will be resistant to breakage, distortion or taking a set.

2 Claims, 9 Drawing Figures

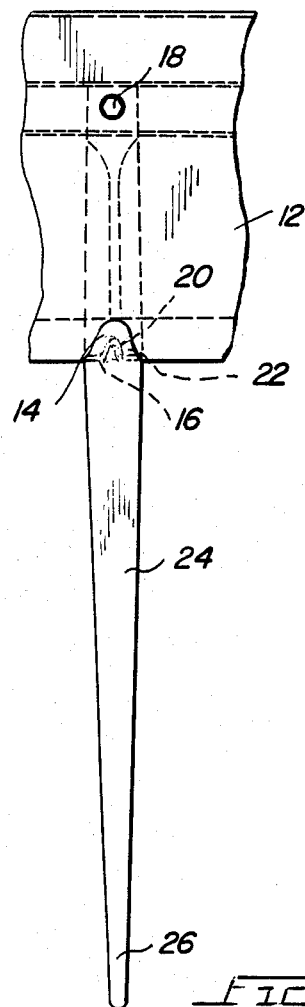
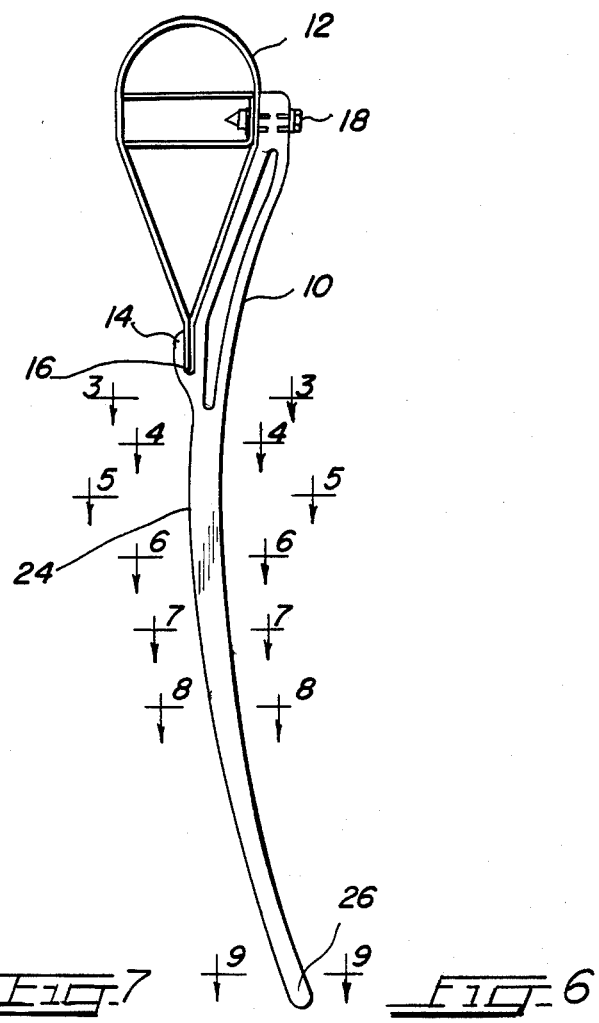
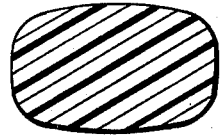 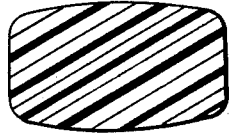  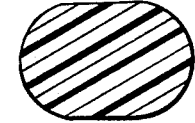
 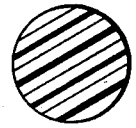 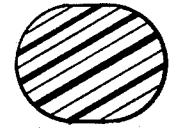

HARVESTER REEL PICKUP TINE

BACKGROUND OF THE INVENTION

Although plastic tines have been used with various harvester reel pickup bat configurations for some time, considerable difficulty has occurred in the field due to breakage of the tines under the stresses generated by the weight or load of the material being harvested as it is engaged by the bats and forced by the tines into the sickle or cutter bar and thence over the cutter bar and onto a draper belt for conveying the harvested material in the combine. The loss of the tines due to breakage or distortion can very well result in a shutdown of the harvesting equipment in order that the broken tines can be replaced.

For these reasons, considerable study has been made to develop an improved plastic tine that will have greater resistance to breakage or distortion such as bending to a fixed set and it is the object of the present invention to provide such an improved tine.

SUMMARY OF THE INVENTION

The improved tine herein disclosed is of more-or-less the conventional shape for a plastic tine, such as that disclosed in Pat. No. 4,459,797, the particular improvement residing in the fact that the new tine is a solid molded body having a particular cross-sectional shape from the tipping portion, which is that part of the tine engaging the leading edge or tip of the harvester reel bat, to the very tip end of the tine finger. This cross-sectional shape of the tine finger is of uniform thickness through approximately one-half of its length and has a width for at least one-half of the finger length that is greater than the finger thickness. This body shape affords strength in at least the upper half portion of the finger length against breakage where such fracture usually occurs, the remainder of the finger length being of gradually reducing circular section until at the very tip, the cross-section is in the form of an oval with the narrow portion being an extension of the tine thickness in the fore-and-aft direction.

This cross-section configuration of the tine finger was developed after careful study of the length and flexure of the tine finger and the material from which it is made under the stresses to which the finger would be normally subjected under the conditions that one would expect to encounter in a normal harvesting operation. Preferably this material is an Acetal Polymer such as DuPont Delrin 100 or Celanese Corporation Celcon M25.

DESCRIPTION OF THE DRAWINGS

A specific embodiment of this invention is shown in the accompanying drawing, in which:

FIG. 1 is a back side elevational view of a tine according to the present invention as it would be applied to a hollow steel harvester reel bat;

FIG. 2 is a side elevational view of the same; and

FIGS. 3 to 9, inclusive, are views showing the cross-sectional configuration of the tine finger as taken on correspondingly numbered lines in FIG. 2.

DESCRIPTION OF A SPECIFIC EMBODIMENT

In the form of the invention herein shown and described, the molded plastic tine would have an overall length of about 12 inches with about the first 3-½ inches directly engaging the metal bat of the harvester reel.

As shown, the upper portion 10 of the tine is shaped to fit the cross-sectional shape of the bat 12 and the portion of the tine engaging the tip or leading edge of the bat 12 is made with an outwardly spaced, upstanding tongue 14 defining a channel 16 about ½ inch deep for reception of the leading edge of the hollow metal bat.

As shown in FIG. 2, the upper end of the tine 10 is secured to the metal bat 12 by a screw 18 and as indicated in FIG. 1, an upwardly projecting post or detent 20, about ¼ inch high, is formed in the bottom of the groove 16 to engage in a notch 22 formed in the bottom edge of the bat 12. Thus the tine is secured to the bat 12 by a single screw and the groove 16 and is held against lateral movement by engagement of the detent 20 in the notch 22.

As shown in FIG. 3, the cross-section of the tine finger 24 at its upper portion, which is at a level about 4.12 inches below the top end of the tine, has a more-or-less rectangular form having a thickness of about 0.42 inch and a width of about 0.73 inch. As the shape of the tine narrows progressively from the level of section 3—3 in the direction of the tip end 26, the thickness immediately (0.20 inch below) reduces to about 0.38 inch at level 4—4 and then stays constant until about the last 4 inches of the tine length, in which the thickness progressively reduces to about 0.25 inch and the width becomes about 0.19 inch.

These dimensions are those of the prototype and production tine and for the sake of a complete description of the shape, it may be noted that the width of the tine narrows progressively from about 0.73 inch at section 3—3, 4.12 inches below the top end, to 0.70 inch at section 4—4; then to 0.66 inch at the level of section 5—5, which is 0.06 inch below section 4—4 and one inch farther, the width becomes 0.56 inch at the level of section 6—6. One inch below section 6—6, the width becomes 0.47 inch at the level of section 7—7 and one inch farther becomes a full circle 0.38 inch in diameter at the level of section 8—8. From section 8—8, the circular cross-section of the tine progressively reduces during the next four inches until near the tip 26 of the tine, the section becomes as an oval having a thickness of about 0.26 inch and a width of about 0.19 inch.

This form of the new plastic tine has the particular advantage that all of the tine flexure takes place below the edge of the steel bat. Also, the main portion of the tine finger flexes in the fore-and-aft direction and not sideways and keeping the thickness of the tine finger constant for approximately one-half of the finger length, keeps the high flexure stress levels well below the point at which fracture might occur. And the 0.38 inch thickness limit ensures good moldability of the tine finger.

Although but one specific embodiment of this invention has been herein shown and described, it will be understood that described details of the structure may be altered within the limits of reasonable equivalency within the spirit of the invention as defined by the following claims.

We claim:

1. A crop pickup tine adapted for mounting on a harvester reel bat and having a bat attachment portion at its upper end and a pickup finger portion of predetermined length extending from the bat attachment portion, the finger portion of the tine having a constant thickness in the front-to-rear direction from adjacent its upper end to more than half the finger length and then decreasing progressively to the finger tip, and the finger width of the tine decreasing progressively from substantially twice its thickness at the said upper end to less than its thickness at the finger tip.

2. A crop pickup tine adapted for mounting on a harvester reel bat and having a length of 11.92 inches and a bat attachment portion extending 4.12 inches from its top end, and a pickup finger portion extending 7.8 inches from the said attachment portion, said finger portion having a thickness of 0.42 inch in the front-to-rear direction at its upper end and from 0.20 inch below that level a constant thickness of 0.38 inch for the next 3.6 inches of finger length, the finger thickness then decreasing progressively to 0.25 inch at the finger tip, and the finger width of the tine being 0.73 inch at its upper end and 0.70 inch at the next 0.20 inch below, the finger width then decreasing progressively to 0.38 inch at 3.8 inches below the said upper end, and the finger width and thickness then decreasing progressively to 0.19 inch and 0.25 inch, respectively, at the finger tip.

* * * * *